US012132702B2

(12) United States Patent
Gunn

(10) Patent No.: US 12,132,702 B2
(45) Date of Patent: Oct. 29, 2024

(54) IP ADDRESS CONTROL SYSTEM

(71) Applicant: MASTERCARD INTERNATIONAL INCORPORATED, Purchase, NY (US)

(72) Inventor: Eric Gunn, St. Charles, MO (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 0 days.

(21) Appl. No.: 17/564,905

(22) Filed: Dec. 29, 2021

(65) Prior Publication Data

US 2023/0208803 A1 Jun. 29, 2023

(51) Int. Cl.
*H04L 61/5007* (2022.01)
*H04L 9/40* (2022.01)

(52) U.S. Cl.
CPC ...... *H04L 61/5007* (2022.05); *H04L 63/0236* (2013.01)

(58) Field of Classification Search
CPC ... H04L 43/10; H04L 61/5053; H04L 63/126; H04L 63/1491; H04L 63/0236; H04L 63/0263; H04L 61/5014; H04B 10/2569
See application file for complete search history.

(56) References Cited

U.S. PATENT DOCUMENTS

| | | | | |
|---|---|---|---|---|
| 7,516,487 B1* | 4/2009 | Szeto | ............... | H04L 63/0263 726/13 |
| 7,523,485 B1* | 4/2009 | Kwan | ............... | H04L 63/1466 726/2 |
| 8,312,270 B1 | 11/2012 | Chou et al. | | |
| 8,325,893 B2 | 12/2012 | Vendrow | | |
| 9,369,428 B2 | 6/2016 | Nadler et al. | | |
| 10,057,419 B2 | 8/2018 | Chan et al. | | |
| 10,205,701 B1 | 2/2019 | Voss et al. | | |
| 10,855,644 B1* | 12/2020 | Vijayvargiya | ...... | H04L 63/0236 |
| 2002/0052960 A1* | 5/2002 | Trisno | ............... | H04B 10/2569 709/251 |
| 2006/0069732 A1 | 3/2006 | Shannon et al. | | |
| 2006/0167871 A1 | 7/2006 | Sorenson et al. | | |

(Continued)

FOREIGN PATENT DOCUMENTS

| | | |
|---|---|---|
| CN | 1248455 C | 3/2006 |
| CN | 104717309 B | 9/2018 |

OTHER PUBLICATIONS

"Use static MAC address binding" Retrieved on Apr. 3, 2020, 1 page, Retrieved from: https://www.watchguard.com/help/docs/help-center/en-US/Content/en-US/Fireware/networksetup/control_int_access_by_mac_c.html.

*Primary Examiner* — Dustin Nguyen
(74) *Attorney, Agent, or Firm* — Talem IP Law, LLP

(57) ABSTRACT

A method of Internet Protocol (IP) address control includes receiving a request from a computing device for a new IP address, the request including a Media Access Control (MAC) address of the computing device. A query can be sent to a storage resource for a whitelist of MAC numbers associated with IP addresses and an IP address not present on the whitelist can be selected for use in assigning the new IP address. A new IP/MAC pairing of the selected IP address and the MAC address of the computing device is sent to the storage resource for adding to the whitelist and optionally to a firewall for adding to a firewall whitelist. A confirmation can be sent to the computing device, providing the new IP address.

17 Claims, 5 Drawing Sheets

(56) References Cited

U.S. PATENT DOCUMENTS

| | | | |
|---|---|---|---|
| 2008/0034092 A1* | 2/2008 | Kikuchi | H04L 63/102 709/225 |
| 2008/0082658 A1 | 4/2008 | Hsu et al. | |
| 2013/0230053 A1* | 9/2013 | Hammer | H04L 63/1441 370/401 |
| 2014/0297890 A1* | 10/2014 | Boddu | H04L 61/5014 709/245 |
| 2016/0330165 A1* | 11/2016 | Jeanne | H04L 43/10 |
| 2017/0093910 A1* | 3/2017 | Gukal | H04L 63/1491 |
| 2018/0234339 A1* | 8/2018 | Uchizumi | H04L 61/5014 |
| 2019/0052636 A1* | 2/2019 | Wang | H04L 63/0236 |
| 2020/0145437 A1* | 5/2020 | Torisaki | H04L 63/126 |
| 2021/0119965 A1* | 4/2021 | Meng | H04L 61/5053 |
| 2021/0344714 A1* | 11/2021 | Yang | H04L 63/1491 |

\* cited by examiner

IP ADDRESS CONTROL SYSTEM

BACKGROUND

An Internet Protocol (IP) address is a numerical label that a computing device, or "host", can use to identify itself for communication on a network. An IP address is usually assigned to each device connected to the network and is currently defined as a 32-bit number or a 128-bit number, depending on the particular IP standard used. IP addresses can be static, where the IP address is assigned to a device and is unchanged aside from certain scenarios, or dynamic, where the IP address assigned to a particular device changes as needed by a network, router, or other computing device.

Because an IP address is assigned to each device on a network, IP addresses can be used by firewalls as rules for allowing (or denying) a particular device access to the network. However, it is possible that multiple computing devices can be assigned to a single IP address—either by malicious intent or by inadvertent behavior. Having more than one device assigned to a particular IP address can create a conflict from the network's perspective and can result in misdirection of data traffic. For example, if two personal computers have the same IP address, data—for example emails—can be sent to the wrong personal computer. This misdirection can create further challenges if, for example, one of the computing devices having the same IP address is a server performing extensive network communications such that significant amounts of traffic that could be sensitive or important to register could be misrouted.

BRIEF SUMMARY

An Internet Protocol (IP) address control system is provided that can manage IP address assignments for access to a secure network for a computing device. The secure network can limit and grant access of particular devices in accordance with the assignments of IP addresses to specific Media Access Control (MAC) addresses managed by the IP address control system. The IP address control system can pair a particular IP address with a specific MAC address so a computing device using the particular IP address can only access the network if it has that specific MAC address. In such a system, a user could not simply change the IP address of a computing device, but would have to request a new IP address, not only to ensure the network allows the traffic but to avoid misdirection of traffic or wasted addresses.

A method of IP address control performed by an IP address control system includes receiving a request from a computing device for a new IP address. The request can include the MAC address of the computing device. A query can be sent by the IP address control system to a storage resource for a current whitelist of IP address/MAC address pairings; and the whitelist can be received by the IP address control system for use in assigning the new IP address. The IP address control system can select a new IP address determined to not be present on the whitelist; and a new IP/MAC pairing of the selected new IP address and the MAC address of the computing device can be sent to the storage resource for adding to the whitelist. The new IP/MAC pairing can also be sent to a firewall for adding to a firewall whitelist. A confirmation can be sent by the IP address control system to the computing device to which the new IP address is assigned. After sending the confirmation to the computing device, a request to remove a previous IP/MAC pairing can be sent to the storage resource and/or the firewall.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

An IP address control system is provided that can manage IP address assignments for access to a secure network for a computing device. The secure network can limit and grant access of particular devices in accordance with the assignments of IP addresses to specific MAC addresses managed by the IP address control system. The IP address control system can pair a particular IP address with a specific MAC address so a computing device using the particular IP address can only access the network if it has that specific MAC address. In such a system, a user could not simply change the IP address of a computing device, but would have to request a new IP address from the IP address control system, not only to ensure the network allows the traffic but to avoid misdirection of traffic or wasted addresses.

The described IP address control system can manage communication with an IPAM, firewall, and a user's computing device and minimize conflicts between the three. The IP address control system can singlehandedly manage many aspects of changing an IP address for a computing device in a secure network. The IP address control system can determine available IP addresses based on a stored whitelist, request to change the IP address of the computing device to a new IP address, and appropriately log the new IP address and MAC address pairing in one or more whitelists to minimize the chance of conflict with existing or future systems in a particular network.

Figure 1:
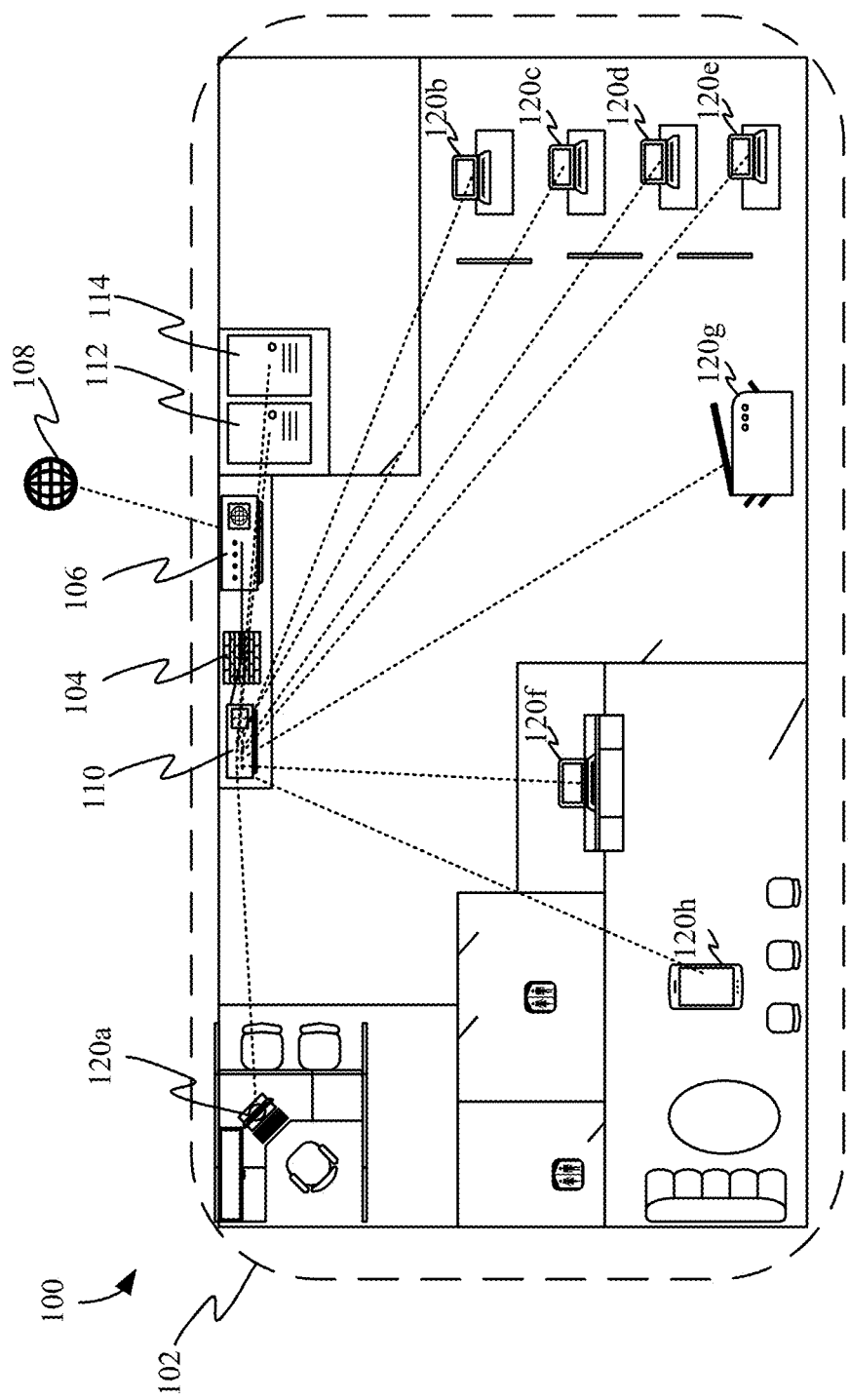
FIG. 1 illustrates an example scenario of a network environment with an IP address control system.

FIG. 1 illustrates an example scenario of a network environment with an IP address control system. Referring to FIG. 1, a network environment 100 can be a secure network 102 with a security system (e.g., firewall 104) between a gateway 106 and the secure network 102 that filters traffic to/from the Internet 108, router hardware 110 that directs traffic on the secure network 102 (e.g., from and to computing devices on the network), a storage resource 112, and an IP address control system 114. Storage resource 112 can be a standalone computing device or integrated with the firewall 104, gateway 106, router 110, or IP address control system 114. Storage resource 112 can be associated with network services such as IP address management IPAM. In the illustrative scenario of FIG. 1, a secure network 102 is provided for computing devices at an enterprise location. Here, there are a plurality of computing devices 120*a*, 120*b*, 120*c*, 120*d*, 120*e*, 120*f*, 120*g*, 120*h*, which include, but are not limited to, user computing devices, printers, and mobile devices. Each computing device has an associated MAC address.

In a secure network 102 having an IP address control system 114, a firewall 104 or other security system can track IP addresses and MAC addresses and only allow certain IP address and MACs to ensure all users on the secure network 102 are legitimate. Through the described IP address control system 114, a certain IP address is only usable by a computing device associated with a particular MAC address to ensure that a malicious user cannot present themselves as a legitimate user by using an otherwise allowed IP address to access the network. The described IP address control system 114 can update all the whitelists that may inform the secure network, such as an IP address management (IPAM) (e.g., associated with storage resource 112) and a firewall 104. Such a single point of IP address assignment can avoid conflict between all the whitelists and also avoids making the firewall 104 a point of vulnerability.

In an improperly managed secure network, for example, a network administrator or administrative user might set up a system or computing device for a new user and may configure the new system or device with an IP address already in use or about to be used by another system or device, which can cause misdirection of traffic. For example, if computing device 120e is assigned the same IP address as printer 120g, printing issues can ensue.

Figure 2:
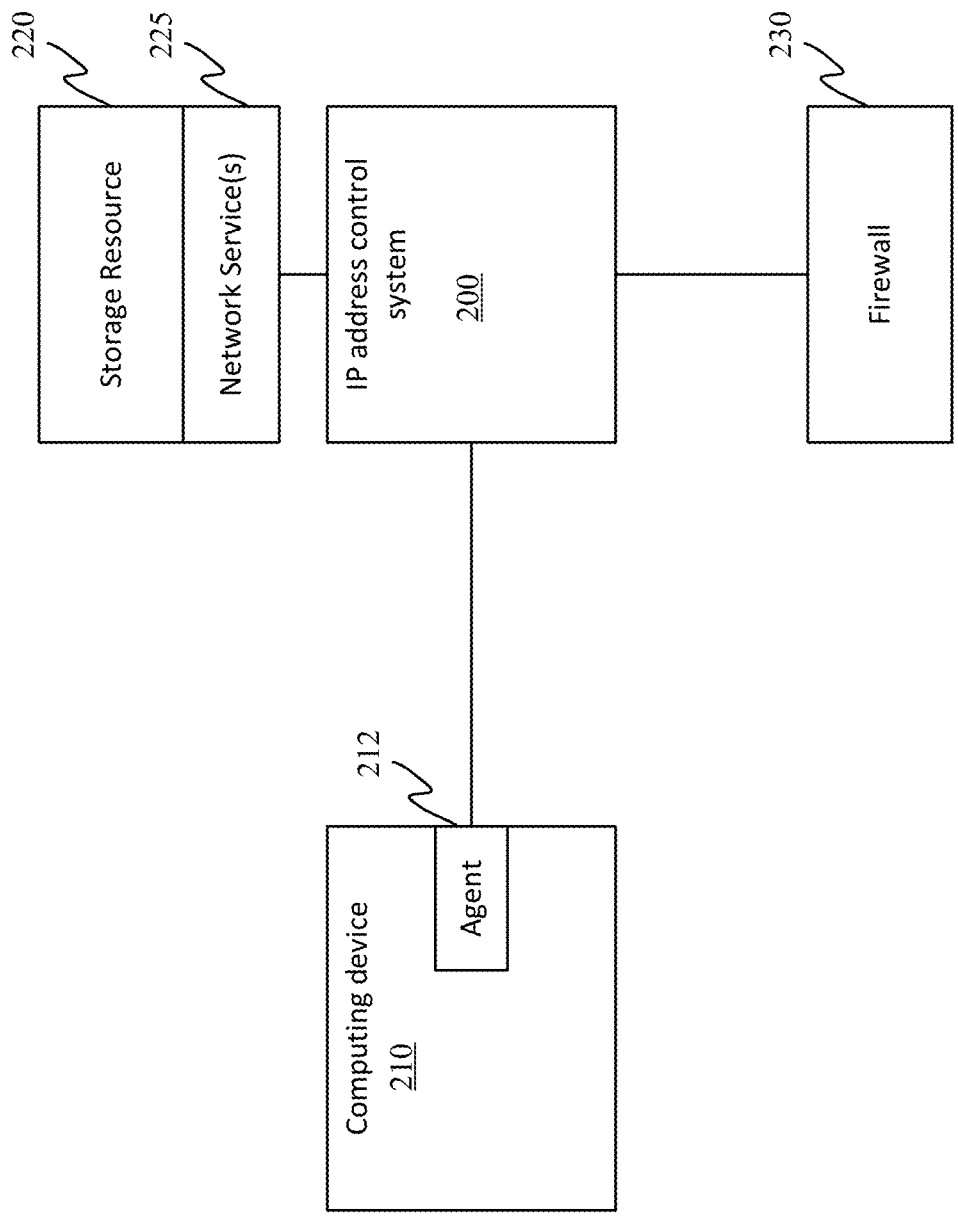
FIG. 2 illustrates an example operating environment for IP address control.
Figure 3:
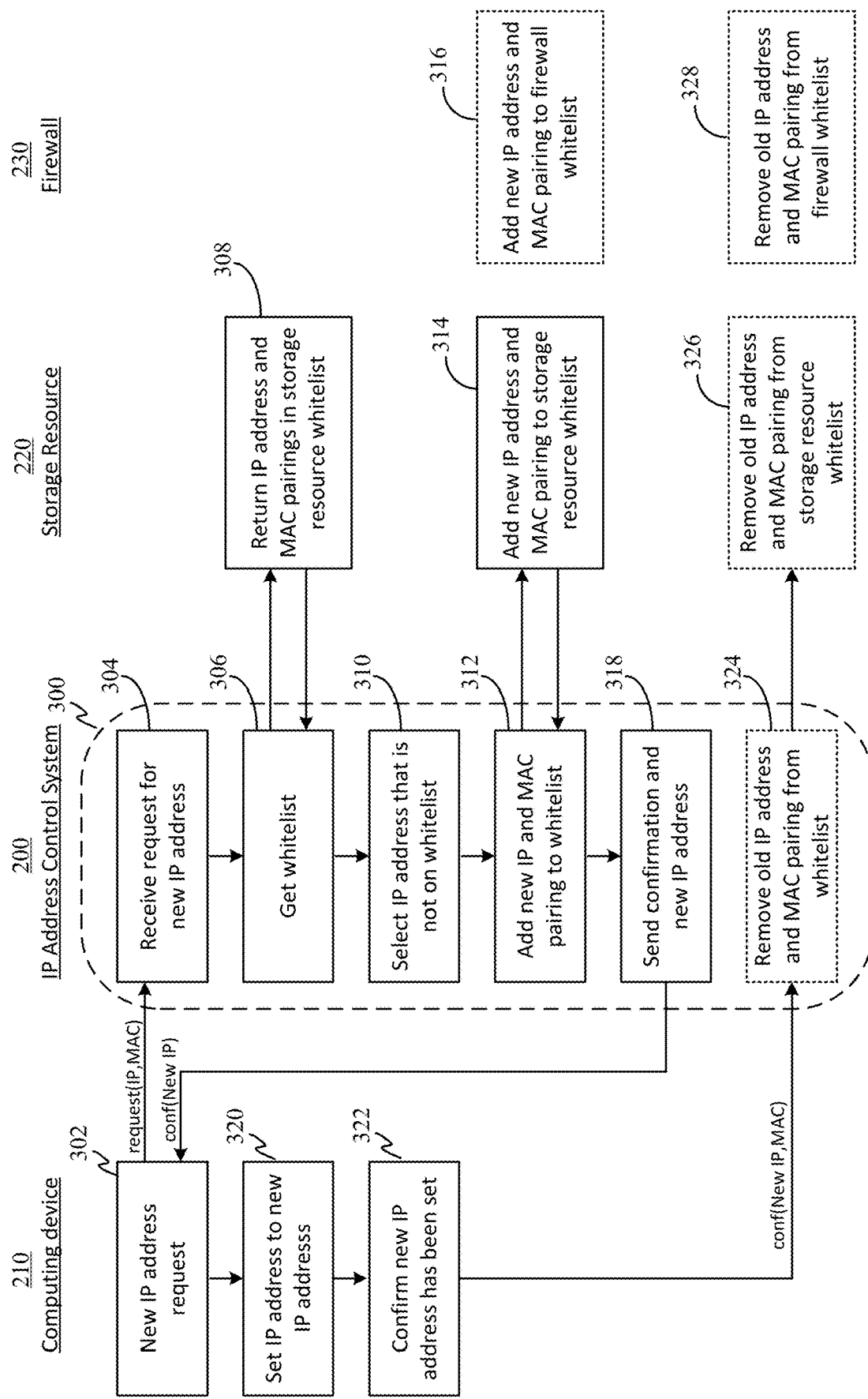
FIG. 3 illustrates an example process flow diagram in an operating environment with an IP address control system.

FIG. 2 illustrates an example operating environment for IP address control; and FIG. 3 illustrates an example process flow diagram in an operating environment with an IP address control system. Referring to FIG. 2, an operating environment for IP address control can include an IP address control system 200, a computing device 210 (with agent 212 performing described processes) for a user, and a storage resource 220, which may be associated with network services 225. A firewall system 230 can also be included.

Figure 4:
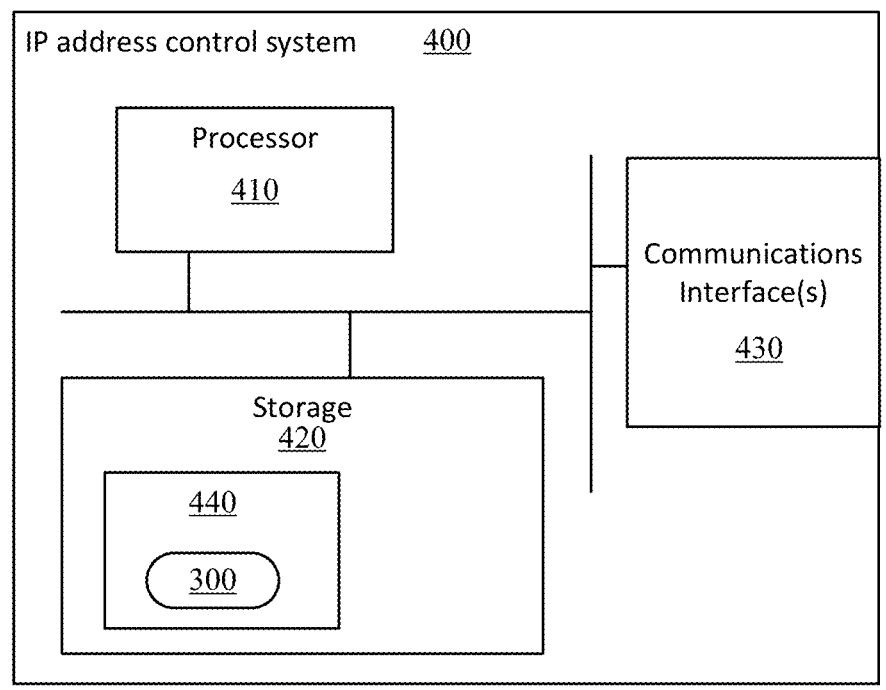
FIG. 4 illustrates a representative computing system that may be used to implement an IP address control system.

The IP address control system 200 can be embodied in a standalone computing device or as part of another network device (e.g., gateway device, modem, firewall device, etc.) or server, for example as described with respect to computing system 400 of FIG. 4. IP address control system 200 carries out process 300 of FIG. 3.

The computing device 210 can be any computing device with a network interface for communicating data across a network (e.g., computing device 120b and printer 120g of FIG. 1). Examples of computing device 210 include, but are not limited to, desktop computer, tablet, laptop, smartphone, printer, scanner, voice over IP (VOIP) phone, and the like. Agent 212 is a software component running on the computing device 210 (e.g., as executable code stored in computer storage that can be executed by a processor of the computing device 210) and which has access to the hardware identification number of the computing device 210 (e.g., as indicated on the network card/chip of the computing device 210). Agent 212 is used to communicate with the IP address control system 200 as described with respect to FIG. 3.

The storage resource 220 can be a standalone computing device or storage or part of a server or other computing device (e.g., such as described with respect to storage resource 112 of FIG. 1). In some specific implementations, such as where network services 225 include IP address management (IPAM), the storage resource 220 can be embodied as an IPAM resource.

Referring to FIG. 3, in the illustrated scenario, the computing device 210 (e.g., via agent) performs a new IP address request 302. There are many purposes for requesting a new IP address. For example, there may be connectivity issues on a network and the agent of the computing device 210 requests a new IP address to attempt to restore network connection. As another example, a new router may be installed or updated for the secure network and the computing device 210 needs to obtain a new IP address for the new or updated router. As yet another example, the computing device 210 may be requesting to access the network for the first time.

The IP address control system 200 receives (304) the request for a new IP address communicated by the computing device 210. The receiving (304) of the request for a new IP address can initiate process 300 at the IP address control system 200. The request for the new IP address can include the MAC address for the computing device 210 and can optionally further include the current IP address for the computing device 210. In response to receiving the request for the new IP address, the IP address control system 200 gets (306) a whitelist of IP address and MAC pairings. In some cases, the IP address control system 200 gets (306) the whitelist by sending a query to the storage resource 220 for the whitelist of MAC numbers associated with IP addresses.

As shown in FIG. 3, the storage resource 220 can respond (308) to the query from the IP address control system 200 with the whitelist IP/MAC pairings. In some implementations, the IP address control system 200 can include the storage resource 220 or otherwise maintain an internal structured data resource storing the IP/MAC pairings, in which case the IP address control system 200 can simply query the internal structured data resource for the whitelist.

Returning to process 300, upon receiving the IP/MAC pairings of the whitelist from the storage resource 220, the IP address control system 200 can select (310) an IP address not present on the whitelist as the new IP address for the computing device 210. Selection (310) of the new IP address can be performed in a variety of ways. In some implementations, selecting the new IP address can be performed by selecting an IP address at random from available IP addresses. In another implementation, selecting the new IP address can be performed by selecting a lowest number IP address among available IP addresses, selecting a highest number IP address among the available IP addresses, or selecting a next available IP address from a list of available IP addresses. In some cases, the request for the new IP address from a computing device includes a requested new IP address and the selecting of the IP address is selecting the requested IP address (upon confirming that the IP address is not present on the whitelist). In one of such implementations, a separate communication may occur between the IP address management system and the agent of the computing device to poll or otherwise obtain a requested new IP address Once the new IP address is selected by the IP address control system 200, the IP address control system 200 can send (312) to the storage resource 220 a new IP/MAC pairing for adding to the whitelist, such that the new IP/MAC pairing of the MAC address of the computing device and the selected IP address is added (314) to the storage resource 220. The communication to add the new IP/MAC pairing can be an application programming interface (API) call to the system associated with the storage resource 220 A similar communication may be sent to any other system on the network that tracks such information (e.g., network control devices). For example, the IP address control system 200 can also send the new IP/MAC pairing to the firewall 230 for adding (316) to a firewall whitelist if a firewall is present in the operating environment.

The IP address control system 200 can send (318) a confirmation to the computing device 210 to which the new IP address is assigned. The confirmation includes the selected new IP address.

The computing device 210 can then set (320) the IP address for the computing device 210 to the new IP address and confirm (322) to the IP address control system 200 that the IP address has been accepted and set. In some cases, the confirmation sent by the computing device 210 to the IP address control system 200 includes the new IP address and MAC of the computing device 210. In some cases, the confirmation further includes a prior IP address.

In some cases, the IP address control system 200 can request (324) to remove a previous IP/MAC pairing for the computing device 210 once a confirmation that the new IP address has been set at the computing device 210. The IP address control system 200 may store the old IP address locally and initiate the request upon receiving the confirmation of update from the computing device 210 and/or the IP address control system 200 may receive the old IP address with the confirmation from the computing device 210 that the new IP address has been set. The request to remove the old IP address and MAC pairing can be sent as an API call to the system associated with the storage resource 220 and a similar communication may be sent to any other system on the network that tracks such information (e.g., network control devices, including the firewall 230, if present). The storage resource 220 can then remove (326) the old IP/MAC pairing from its whitelist and similarly the firewall can remove (328) the old IP/MAC pairing from its whitelist.

In some cases, the IP address control system 200 requests (324) to remove a particular IP address and MAC pairing based on other triggers. For example, to support a guest process that allows for temporary IP addresses for users that have limited access to the network, for example outside contractors where there is a length of time for access. The length of time may be embodied as an end time for access (e.g., expires at 5:00 P.M. on Friday instead of in 48 hours). After the length of time for access has elapsed, the IP/MAC pairing can automatically be scheduled for removal from the storage resource 220 and firewall 230. The automatic scheduling of removal can be entirely or partially handled by the IP address control system, but the automatic scheduling of removal can also be handled by one of or both of the storage resource 220 (e.g., via an IPAM) and the firewall 230.

FIG. 4 illustrates a representative computing system that may be used to implement an IP address control system. Referring to FIG. 4, a computing system 400 implementing an IP address control system can include at least one processor 410; storage 420; and one or more communications interfaces 430. One or more of the components of system 400 may be implemented together as a system-on-chip (SoC).

The at least one processor 410 can include a central processing unit (CPU), a graphics processing unit (GPU), an application specific processor, logic devices, as well as any other type of processing device, combinations, or variations thereof.

The storage 420 can include volatile and nonvolatile memories, removable and non-removable media implemented in any method or technology for storage of information, such as computer readable instructions, data structures, program modules, or other data. Examples of storage 420 include storage devices in the form of random-access memory, read only memory, magnetic disks, optical disks, CDs, DVDs, flash memory, magnetic cassettes, magnetic tape, magnetic disk storage or other magnetic storage devices, or any other suitable storage media. In no case is a storage resource implementing the storage 420 a transitory propagated signal. In some cases, storage 420 includes components implemented across multiple storage devices or sub-systems co-located or distributed relative to each other (and accessible via system bus or over a network via one of the one or more communications interfaces 430).

Storage 420 stores instructions 440 for the processes carried out by the IP address control system, including process 300 described with respect to FIG. 3. Storage 420 also stores data received from computing devices with requests for new IP address assignments and data received from storage resources such as whitelists of IP/MAC pairings.

In some cases, a computer-readable storage medium can be provided that stores instructions for performing processes 300 as described with respect to FIG. 3. It should be understood that such a "computer-readable storage medium" does not consist of transitory propagating signals.

Alternatively, or in addition, the functionality, methods, and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

The one or more communications interfaces 430 support communications from computing devices on the network via a wireless access point or wired network connection; and support communications with an external network via a modem (and routers).

In some cases, the described IP address control system can be used in association with security testing. A common form of security testing involves dividing a group of testers into an offensive team—assigned to attack an infrastructure—and a defensive team—designed to protect infrastructure or the data within or otherwise prevent access. A common defensive strategy is to implement rules in a firewall to block IP addresses used by members of the offensive team, which itself can be circumvented by simply changing which IP addresses are used. Practically, changing an IP address would have a cost to an attacker, but a network without the described IP address control system may allow an attacking device access to the system if the attacking member guesses an acceptable IP address. The IP address control system as described herein may be used for security testing schemes so that appropriate penalties can be applied to team members when one attempts to avoid being blocked from the network by changing their own IP address.

Figure 5:
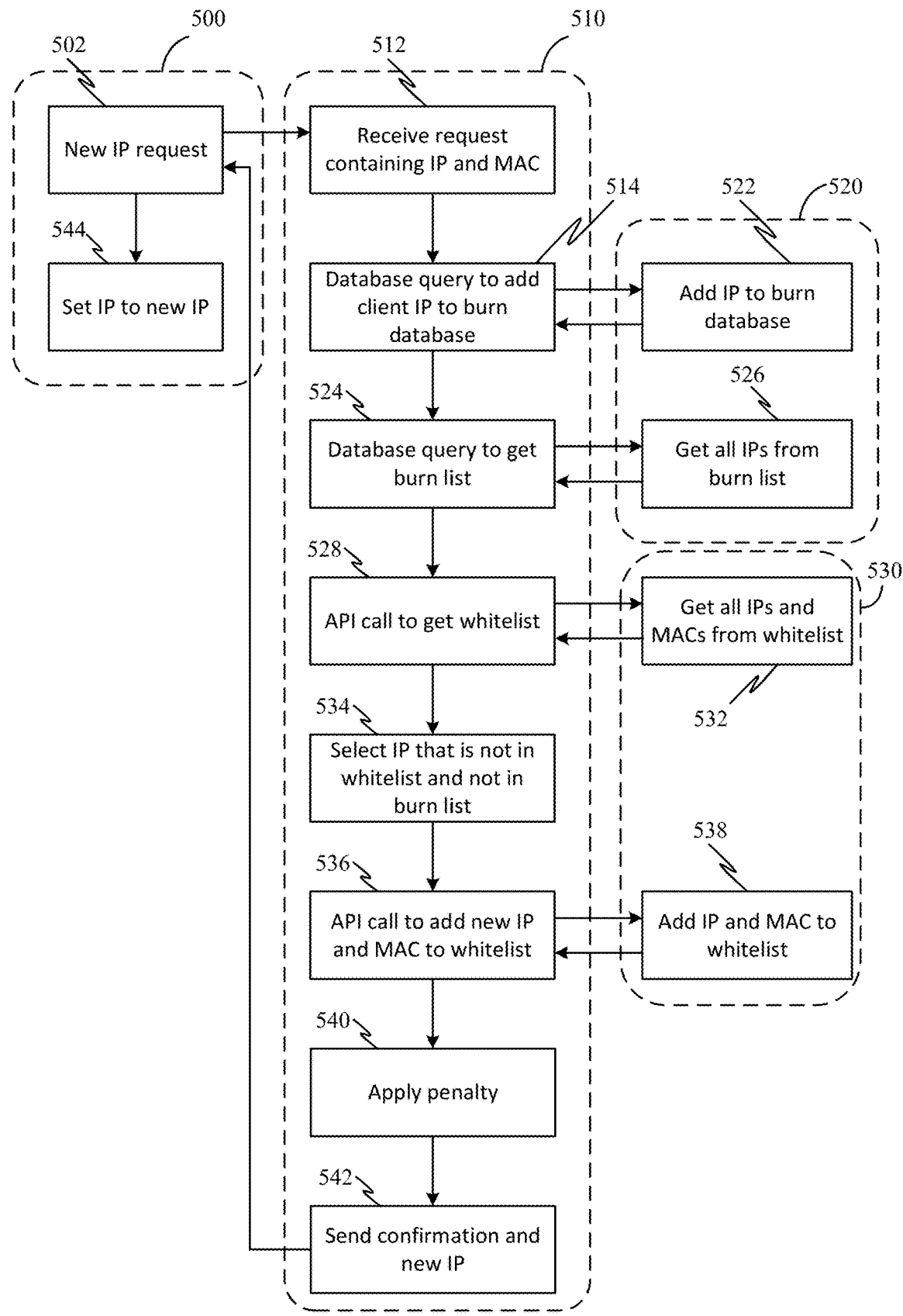
FIG. 5 illustrates an alternative use case and implementation of an IP address control system in security testing.

FIG. 5 illustrates an alternative use case and implementation of an IP address control system in security testing. In the illustrated scenario, a member of the attacking team can, via computing device 500, request (502) a new IP address through an IP address control system 510 executing instructions for supporting a cyber defense exercise. For the processes supporting the cyber defense exercise, the IP address control system 510 receives (512) the new IP request from the computing device 500, which includes the current IP address and the MAC of the computing device 500. The IP address control system 510 can have the IP address currently used by the computing device 500 added (514) to a burn database, for example managed by an IPAM 520, which adds (522) the IP address to the burn database in response to the database query to add (514) the IP address to the burn database. The burn database can include a burn list that includes all or a subset of previously used IP addresses by computing devices of all the members in the offensive team. The burn database can be located on a storage resource within the IP address control system 510 as a local database or stored on a separate computing system associated with network services such as the IPAM 520.

The burn database can also be queried by the IP address control system 510 to get (524) the burn list, which is provided (526) by the IPAM 520. The IP address control system 510 can also obtain a whitelist of the IP/MAC pairings by sending (528) a request to the IPAM 530 (e.g., an API call to the IPAM 530). The IPAM 530 can return (532) the whitelist. Here, IPAM 520 and IPAM 530 may be a same network service or may be different network services. In addition, the storage resource storing the burn list and the white list may be the same or different storage resource and may be integrated with the IP address control system 510 or may be part of one or more separate systems Once the whitelist and burn list are obtained, the IP address control system 510 can select (534) a new IP address, which is an IP address that is in neither the whitelist nor the burn list. The IP address control system 510 can then send (536) the new IP address as well as the MAC address of the computing device 500 to the IPAM 530 (e.g., via an API call to add the new IP and MAC to whitelist). The IPAM 530 can add (538) the paired new IP address and the MAC address of the computing device 500 to the whitelist in a storage resource. The IP address control system 510 can penalize (540) the offensive team. Penalizing can be performed in a variety of ways, including, but not limited to, sending a request to subtract points to a point tracker that can be either local or remote to the IP address control system 510, waiting a certain amount of time to respond to the computing device 500 with the new IP address, or giving points to a defensive team. The IP address control system 510 can eventually respond (542) to the computing device 500 with the new IP address, at which point the computing device 500 can set (544) the IP address for the computing device 500 as the new IP address.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. An Internet Protocol (IP) address control system comprising:
    a processor;
    storage;
    communications interface; and
    instructions stored on the storage that when executed by the processor direct the IP address control system to:
        receive a request from a computing device for a new IP address, the request for the new IP address comprising at least a Media Access Control (MAC) address of the computing device;
        send a query to a storage resource for a whitelist of MAC numbers associated with IP addresses;
        receive, from the storage resource, the whitelist;
        select an IP address not present on the whitelist as the new IP address, wherein the whitelist comprises a previous IP/MAC pairing for the computing device, the previous IP/MAC pairing comprising the MAC address of the computing device and a previous IP address;
        send, to the storage resource, a new IP/MAC pairing for adding to the whitelist, wherein the new IP/MAC pairing comprises the MAC address of the computing device and the selected IP address, wherein the new IP/MAC pairing is added to the whitelist having the previous IP/MAC pairing;
        send a confirmation to the computing device to which the new IP address is assigned, wherein the confirmation comprises the selected IP address; and
        request to remove, from the storage resource, the previous IP/MAC pairing for the computing device after sending the confirmation to the computing device to which the new IP address is assigned.

2. The IP address control system of claim 1, further comprising instructions to:
    send the new IP/MAC pairing to a firewall for adding to a firewall whitelist.

3. The IP address control system of claim 1, wherein the storage resource is an Internet Protocol address management (IPAM) resource.

4. The IP address control system of claim 1, wherein the instructions to select the IP address direct the IP address control system to:
    select the IP address at random from available IP addresses.

5. The IP address control system of claim 1, wherein the instructions to select the IP address direct the IP address control system to:
    select a lowest number IP address among available IP addresses.

6. The IP address control system of claim 1, wherein the instructions to select the IP address direct the IP address control system to:
    select a highest number IP address among available IP addresses.

7. The IP address control system of claim 1, wherein the instructions to select the IP address direct the IP address control system to:
    select a next available IP address from a list of available IP addresses.

8. The IP address control system of claim 1, wherein the instructions to select the IP address direct the IP address control system to:
    select a particular IP address requested by the computing device as part of the request from the computing device for the new IP address.

9. A method of Internet Protocol (IP) address control comprising:
    receiving a request from a computing device for a new IP address, the request for the new IP address comprising at least a Media Access Control (MAC) address of the computing device;
    sending a query to a storage resource for a whitelist of MAC numbers associated with IP addresses;
    receiving, from the storage resource, the whitelist;
    selecting an IP address not present on the whitelist as the new IP address, wherein the whitelist comprises a previous IP/MAC pairing for the computing device, the previous IP/MAC pairing comprising the MAC address of the computing device and a previous IP address;
    sending, to the storage resource, a new IP/MAC pairing for adding to the whitelist, wherein the new IP/MAC pairing comprises the MAC address of the computing device and the selected IP address, wherein the new IP/MAC pairing is added to the whitelist having the previous IP/MAC pairing;

sending a confirmation to the computing device to which the new IP address is assigned, wherein the confirmation comprises the selected IP address; and after sending the confirmation to the computing device to which the new IP address is assigned, requesting to remove, from the storage resource, the previous IP/MAC pairing for the computing device.

10. The method of claim 9, further comprising:
sending the new IP/MAC pairing to a firewall for adding to a firewall whitelist.

11. The method of claim 9, wherein the storage resource is an Internet Protocol address management (IPAM) resource.

12. The method of claim 9, wherein selecting the IP address comprises selecting the IP address at random from available IP addresses.

13. The method of claim 9, wherein selecting the IP address comprises selecting a lowest number IP address among available IP addresses, selecting a highest number IP address among the available IP addresses, or selecting a next available IP address from a list of the available IP addresses.

14. The method of claim 9, wherein selecting the IP address comprises selecting a particular IP address requested by the computing device as part of the request from the computing device for the new IP address.

15. A computer-readable storage medium having instructions stored thereon that, when executed, direct a computing system to:

receive a request from a computing device for a new IP address, the request for the new IP address comprising at least a Media Access Control (MAC) address of the computing device;

send a query to a storage resource for a whitelist of MAC numbers associated with IP addresses;

receive, from the storage resource, the whitelist;

select an IP address not present on the whitelist as the new IP address, wherein the whitelist comprises a previous IP/MAC pairing for the computing device, the previous IP/MAC pairing comprising the MAC address of the computing device and a previous IP address;

send, to the storage resource, a new IP/MAC pairing for adding to the whitelist, wherein the new IP/MAC pairing comprises the MAC address of the computing device and the selected IP address, wherein the new IP/MAC pairing is added to the whitelist having the previous IP/MAC pairing;

send a confirmation to the computing device to which the new IP address is assigned, wherein the confirmation comprises the selected IP address; and request to remove, from the storage resource, the previous IP/MAC pairing for the computing device after sending the confirmation to the computing device to which the new IP address is assigned.

16. The computer-readable storage medium of claim 15, further comprising instructions to:
send the new IP/MAC pairing to a firewall for adding to a firewall whitelist.

17. The computer-readable storage medium of claim 15, wherein the storage resource is an Internet Protocol address management (IPAM) resource.

* * * * *